US012387518B2

(12) United States Patent
Zagaynov et al.

(10) Patent No.: US 12,387,518 B2
(45) **Date of Patent: *Aug. 12, 2025**

(54) EXTRACTING MULTIPLE DOCUMENTS FROM SINGLE IMAGE

(71) Applicant: ABBYY Development Inc., Dover, DE (US)

(72) Inventors: Ivan Zagaynov, Dolgoprudniy (RU); Aleksandra Stepina, Dubna (RU)

(73) Assignee: ABBYY Development Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,101

(22) Filed: Mar. 11, 2024

(65) Prior Publication Data

US 2024/0212382 A1 Jun. 27, 2024

Related U.S. Application Data

(63) Continuation of application No. 17/133,794, filed on Dec. 24, 2020, now Pat. No. 11,972,626.

(30) Foreign Application Priority Data

Dec. 22, 2020 (RU) .......................... RU2020142364

(51) Int. Cl.
*G06V 30/414* (2022.01)
*G06F 18/214* (2023.01)
*G06V 10/25* (2022.01)

(52) U.S. Cl.
CPC .......... *G06V 30/414* (2022.01); *G06F 18/214* (2023.01); *G06V 10/25* (2022.01)

(58) Field of Classification Search
CPC ...... G06K 9/6256; G06V 10/25; G06V 10/82; G06V 30/414
See application file for complete search history.

(56) References Cited

U.S. PATENT DOCUMENTS 10,685,223 B2 6/2020 Nepomniachtchi et al.
11,972,626 B2 * 4/2024 Zagaynov ............ G06V 30/414
(Continued)

FOREIGN PATENT DOCUMENTS

RU 2691214 C1 6/2019
RU 2695054 C1 7/2019
(Continued)

OTHER PUBLICATIONS

Cong N. T., et al., "Information Extraction From ID Card via Computer Vision Techniques," Faculty of Information Technology, VNU University of Engineering and Technology, 144 Xuan Thuy Street, Cau Giay, Hanoi, Vietnam, 8 Pages.
Deng D., et al., "PixelLink: Detecting Scene Text via Instance Segmentation," In the Thirty-Second AAAI Conference on Artificial Intelligence (AAAI-18), 2018, pp. 6773-6780.
Kasliwal V., et al., "ID Card Border Detection using Emgu CV," Peritos Solutions, Jul. 24, 2017, 7 Pages, Retrieved from URL: https://medium.com/peritos-solutions/id-card-border-detection-using-emgu-cv-59aa1114397d.
(Continued)

*Primary Examiner* — Michael J Vanchy, Jr.
(74) *Attorney, Agent, or Firm* — Lowenstein Sandler LLP

(57) ABSTRACT

System and method for document image detection, comprising: producing, using a neural network, a superpixel segmentation map of an input image; generating a superpixel binary mask by associating each superpixel of the superpixel segmentation map with a class of a predetermined set of classes; identifying one or more connected components in the superpixel binary mask; for each connected component of the superpixel binary mask, identifying a corresponding minimum bounding polygon; creating one or more image dividing lines based on the minimum bounding polygons; and defining boundaries of one or more objects of interest based on at least a subset of the image dividing lines.

20 Claims, 7 Drawing Sheets

605
615
615
610

(56) References Cited

U.S. PATENT DOCUMENTS

| | | | |
|---|---|---|---|
| 2009/0116755 | A1 | 5/2009 | Neogi et al. |
| 2019/0206056 | A1 | 7/2019 | Georgescu et al. |
| 2019/0294641 | A1* | 9/2019 | Alexeev ................. G06V 10/82 |
| 2019/0384954 | A1 | 12/2019 | Lyubimov et al. |
| 2020/0014937 | A1 | 1/2020 | Grangetto et al. |
| 2020/0125881 | A1* | 4/2020 | Pribble ................ G06V 30/414 |
| 2021/0004962 | A1 | 1/2021 | Tsai et al. |
| 2021/0019883 | A1 | 1/2021 | Krauth et al. |
| 2022/0122347 | A1 | 4/2022 | Bhatt et al. |

FOREIGN PATENT DOCUMENTS

| | | | |
|---|---|---|---|
| RU | 2699687 | C1 | 9/2019 |
| RU | 2726185 | C1 | 7/2020 |

OTHER PUBLICATIONS

Stenhagen P., “Improving Realism in Synthetic Barcode Images using Generative Adversarial Networks,” Master of Science Thesis in Electrical Engineering Department of Electrical Engineering, Linkoping University, 2018, 83 Pages.

Ventsov N.N., et al., “Localization of Barcodes Using Artificial Neural Network,” IEEE East-West Design & Test Symposium (EWDTS), 2018, pp. 1-3, Retrieved from URL: https://ieeeexplore.ieee.org/document/8524837.

Yu F., et al., “Multi-scale Context Aggregation by Dilated Convolutions,” CoRR, 2015, vol. abs/1511.07122, 13 Pages.

Zhao Q., et al., “Deep Dual Pyramid Network for Barcode Segmentation Using Barcode-30k Database,” Jul. 31, 2018, pp. 1-13.

* cited by examiner

700

EXTRACTING MULTIPLE DOCUMENTS FROM SINGLE IMAGE

RELATED APPLICATIONS

This application is a continuation of U.S. patent application Ser. No. 17/133,794, filed Dec. 24, 2020, which claims priority under 35 USC 119 to Russian patent application No. 2020142364, filed Dec. 22, 2020. Both above-referenced applications are incorporated by reference herein.

TECHNICAL FIELD

The implementations of the disclosure relate generally to computer systems and, more specifically, to systems and methods for document image detection.

BACKGROUND

One of the main problems in automatic document identification, classification, and processing is detecting multiple documents that have been copied, photographed, or scanned onto a single image frame. Conventional methods do not address such complication. The present invention offers novel and effective system and method of dealing with this problem.

SUMMARY OF THE DISCLOSURE

Implementations of the present disclosure describe mechanisms for extracting multiple documents from a single image. A method of the disclosure includes producing, using a neural network, a superpixel segmentation map of an input image; generating a superpixel binary mask by associating each superpixel of the superpixel segmentation map with a class of a predetermined set of classes; identifying one or more connected components in the superpixel binary mask; for each connected component of the superpixel binary mask, identifying a corresponding minimum bounding polygon; creating one or more image dividing lines based on the minimum bounding polygons; and defining boundaries of one or more objects of interest based on at least a subset of the image dividing lines; wherein the neural network comprises: a downscale block; a context block; and a final classification block; wherein the neural network further comprises a rectifier activation function. In some implementation the method further comprises cropping each region of interest of the one or more regions of interest to produce a corresponding document image; determining whether two or more regions of interest belong to a single multi-part document. In some implementations the neural network is trained using augmented images. In some implementations identifying the minimum bounding polygon further comprises: generating a plurality of candidate lines for the minimum bounding polygon; computing a value of a quality metric for a set of regions of interest that are defined using the plurality of candidate lines, wherein generating the plurality of candidate lines for the minimum bounding polygon further comprises: responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a candidate boundary of the bounding polygon, wherein the first line is provided by one of: a row of the superpixel binary mask or a column of the superpixel binary mask; wherein generating the plurality of candidate lines for the minimum bounding polygon further comprises: utilizing, as a candidate boundary of the bounding polygon, a line traversing a center of the superpixel binary mask; wherein computing a value of a quality metric for the set of regions of interest further comprises: applying, to the set of regions of interest, a trainable classifier.

A non-transitory machine-readable storage medium of the disclosure includes instructions that, when accessed by a processing device, cause the processing device to: produce, using a neural network, a superpixel segmentation map of an input image; generate a superpixel binary mask by associating each superpixel of the superpixel segmentation map with a class of a predetermined set of classes; identify one or more connected components in the superpixel binary mask; for each connected component of the superpixel binary mask, identify a corresponding minimum bounding polygon; create one or more image dividing lines based on the minimum bounding polygons; and define boundaries of one or more objects of interest based on at least a subset of the image dividing lines; wherein the neural network comprises: a downscale block; a context block; and a final classification block; wherein the neural network further comprises a rectifier activation function. In some implementation the method further comprises cropping each region of interest of the one or more regions of interest to produce a corresponding document image; determining whether two or more regions of interest belong to a single multi-part document. In some implementations the neural network is trained using augmented images. In some implementations identifying the minimum bounding polygon further comprises: generating a plurality of candidate lines for the minimum bounding polygon; computing a value of a quality metric for a set of regions of interest that are defined using the plurality of candidate lines, wherein generating the plurality of candidate lines for the minimum bounding polygon further comprises: responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a candidate boundary of the bounding polygon, wherein the first line is provided by one of: a row of the superpixel binary mask or a column of the superpixel binary mask; wherein generating the plurality of candidate lines for the minimum bounding polygon further comprises: utilizing, as a candidate boundary of the bounding polygon, a line traversing a center of the superpixel binary mask; wherein computing a value of a quality metric for the set of regions of interest further comprises: applying, to the set of regions of interest, a trainable classifier.

A system of the disclosure includes a memory, and a processing device operatively coupled to the memory, the processing device to produce, using a neural network, a superpixel segmentation map of an input image; generate a superpixel binary mask by associating each superpixel of the superpixel segmentation map with a class of a predetermined set of classes; identify one or more connected components in the superpixel binary mask; for each connected component of the superpixel binary mask, identify a corresponding minimum bounding polygon; create one or more image dividing lines based on the minimum bounding polygons; and define boundaries of one or more objects of interest based on at least a subset of the image dividing lines; wherein the neural network comprises: a downscale block; a context block; and a final classification block; wherein the neural network further comprises a rectifier activation function. In some implementation the method further comprises cropping each region of interest of the one or more regions of interest to produce a corresponding document image; determining whether two or more regions of interest belong to a single multi-part document. In some implementations the neural network is trained using augmented images. In some implementations identifying the minimum bounding polygon further comprises: generating a plurality of candidate lines for the minimum bounding polygon; computing a value of a quality metric for a set of regions of interest that are defined using the plurality of candidate lines, wherein generating the plurality of candidate lines for the minimum bounding polygon further comprises: responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a candidate boundary of the bounding polygon, wherein the first line is provided by one of: a row of the superpixel binary mask or a column of the superpixel binary mask; wherein generating the plurality of candidate lines for the minimum bounding polygon further comprises: utilizing, as a candidate boundary of the bounding polygon, a line traversing a center of the superpixel binary mask; wherein computing a value of a quality metric for the set of regions of interest further comprises: applying, to the set of regions of interest, a trainable classifier.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

The task of document grouping and processing is often complicated when more than one document is present in a single image to be processed.

For instance, when a person submits copies of their identification documents, he/she would often scan his/her driver's license, passport, social security card onto a single page. Other examples of images that create similar problems are pages with multiple retail receipts or travel documents (such as airplane tickets) copied onto a single page when submitted to an accounting department.

Usually such submissions cannot be processed automatically and have to be handled manually, which both consumes resources and creates potential for processing errors. The present invention offers novel approach to solving this problem.

To process an image with multiple documents, the system needs to recognize that there is more than one document present in that image and then divide such image into multiple images, such that each resulting image would encompass a single document.

As used herein, "electronic image" (also referred to simply as "image" herein) may refer to any picture accessible to a computing system. The picture may be a scanned picture, a photographed picture, or any other representation of an image that is capable of being converted into a data form accessible to a computer. For example, "electronic image" may refer to a file comprising one or more digital content items that may be visually rendered to provide a visual representation of one more electronic document (e.g., on a display or a print medium). In accordance with various implementations of the present disclosure, an electronic image may conform to any suitable electronic file format, such as PDF, DOC, ODT, JPEG, etc.

"Document" may represent a financial document, a legal document, or any other document, e.g., a document that is produced by populating fields with alphanumeric symbols (e.g., letters, words, numerals) or images, an identification card, a passport, a receipt, a ticket, or a partial ticket (ticket stub). "Document" may represent a document that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on.

Figure 1:
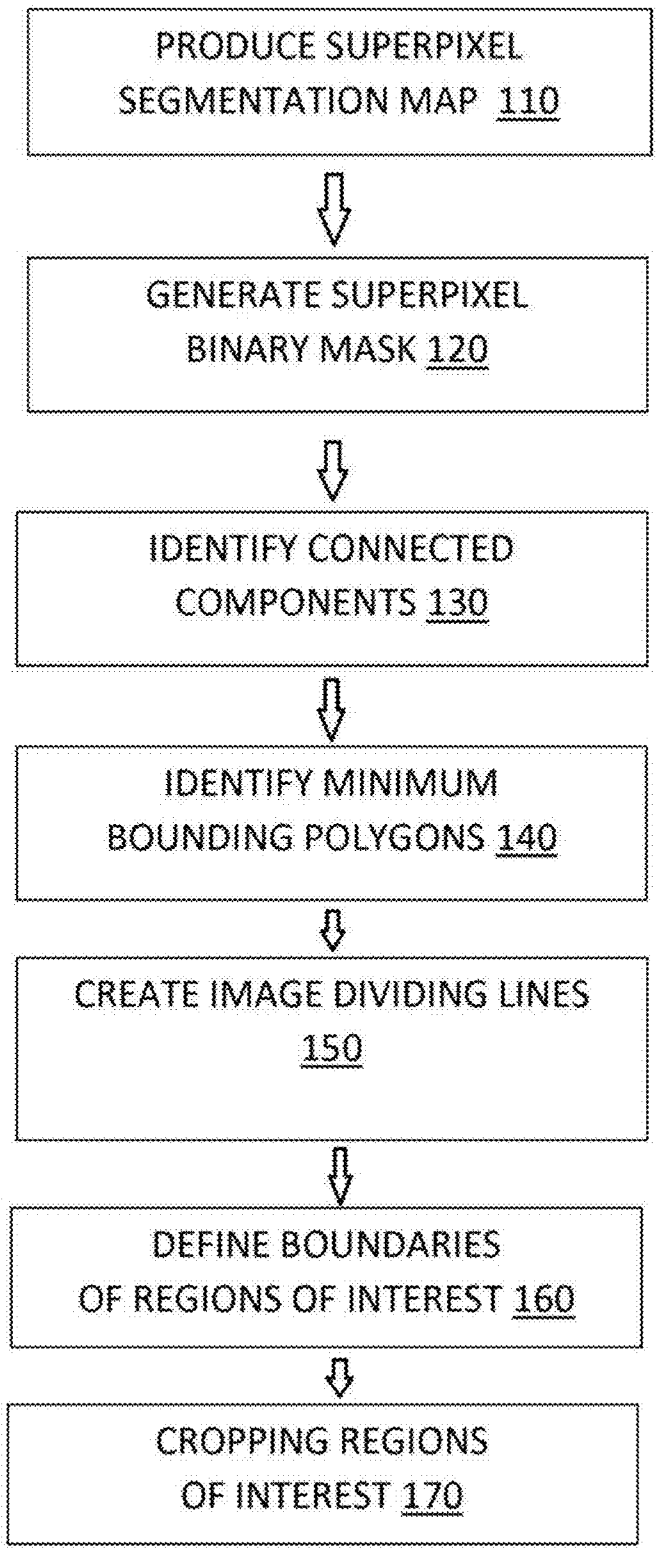
FIG. 1 is a flow diagram illustrating one exemplary method of extracting multiple documents from single image, in accordance with some implementations of the present disclosure.

FIG. 1 is a flow diagram illustrating exemplary method 100 of extracting multiple documents from a single image, in accordance with some implementations of the present disclosure. Method 100 may be performed by processing logic that may comprise hardware (e.g., circuitry, dedicated logic, programmable logic, microcode, etc.), software (such as instructions run on a processing device), firmware, or a combination thereof. In one implementation, method 100 may be performed by a processing device (e.g. a processing device 302 of FIG. 3) of a computing device 210 and/or a server machine 250 as described in connection with FIG. 2. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated descriptions list the operations of method 100 in certain order, various implementations of the methods may perform at least some of the described operations in parallel and/or in arbitrary selected orders.

Figure 4:
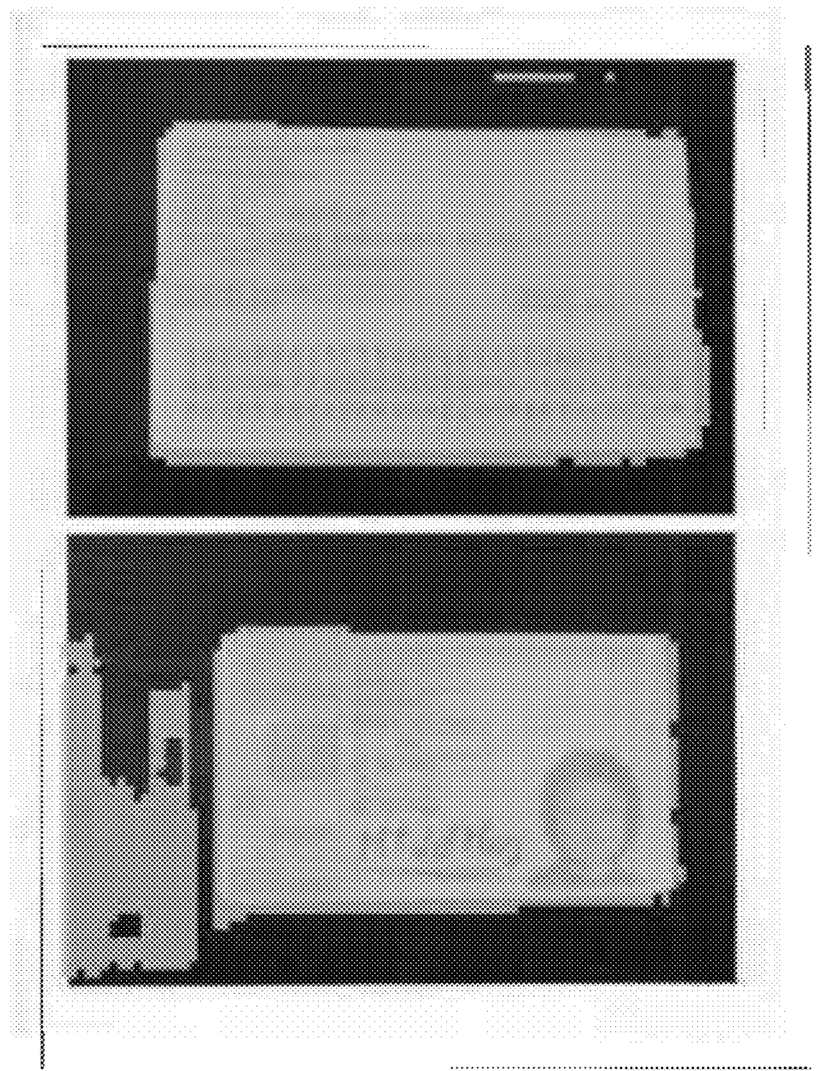
FIGS. 4-5 illustrate exemplary segmentation maps produced in accordance with some implementations of the present disclosure.
Figure 5:
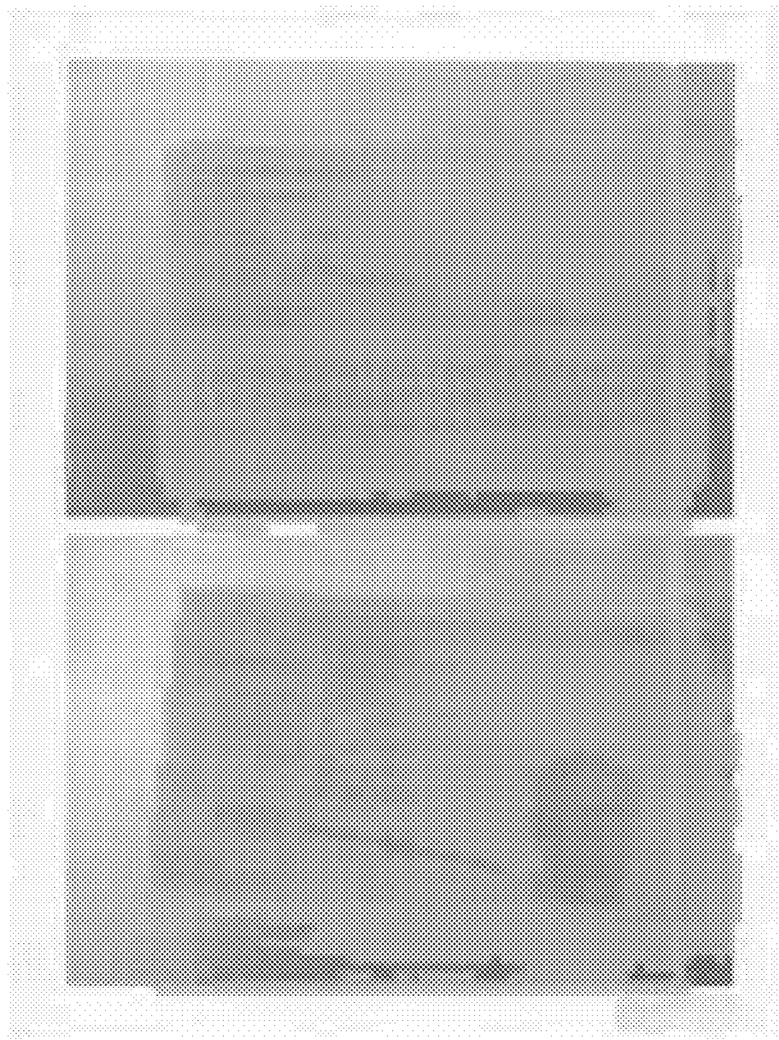

At block 110, the processing device performing method 100 may produce a superpixel segmentation map of an input image (as illustrated on FIGS. 4-5). Each superpixel may be represented by a rectangular set of pixels of the input image (e.g., n×n pixels, where n is a chosen integer). For each superpixel, the semantic segmentation map specifies one or more probability characteristics, such that each probability characteristic represents the probability of the corresponding superpixel belonging to a certain object that is found in the input image. The object may be identified by the index of the probability characteristics in the list of probability characteristics associated with the superpixel. In an illustrative example, each superpixel may be associated with a single probability characteristic, which represents the probability of the corresponding superpixel belonging to a certain object that is found in the input image.

The superpixel segmentation map may be produced using a neural network. The neural network may include multiple neurons that are associated with learnable weights and biases. The neurons may be arranged in layers. The neural network may be trained on a training dataset of documents that contain known images. For example, the training data set may include a set of images, such that each image depicts one or more documents and is associated with metadata specifying the document borders within the image.

In some implementations of the present invention, the training data set may contain real life examples of images to be processed by the system ("in the wild" documents). In other implementations, the training data set may contain synthetic and/or augmented images. The types of augmentation that may be applied to the images in the training data set may include shifting, turning, shadowing, adding artefacts or other objects to the image, etc.

In yet another implementation, the training data set comprises a combination of synthetic and "in the wild" images.

The neural network may generate an observed output for each training input. The observed output of the neural network may be compared with a target output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize the prediction accuracy. Once trained, the neural network may be used for automatic document extraction.

In some implementations of the present disclosure, the neural network is a semantic segmentation neural network.

A semantic segmentation neural network is a neural network configured to perform semantic image segmentation. A semantic image segmentation is a computer vision task in which specific regions of an image are labeled according to what is being shown in the image. In other words, semantic image segmentation simultaneously detects objects in an image and identifies these objects as belonging to a certain class.

In some implementations of the present invention, the neural network is implemented as a set of convolutional layers.

Figure 7:
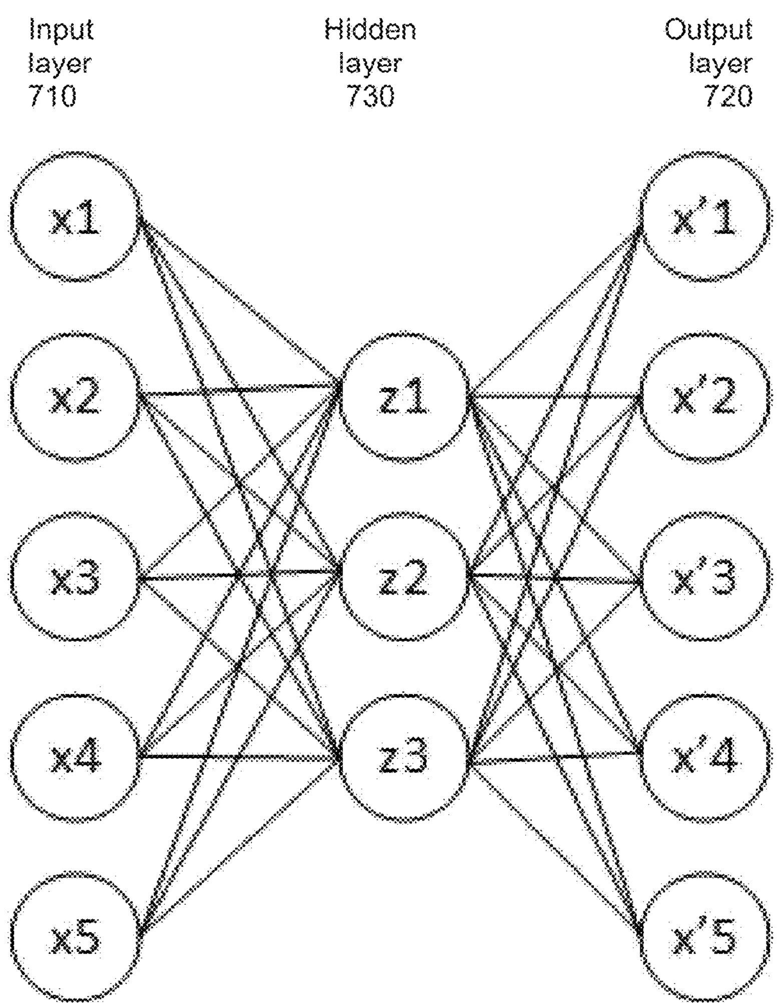
FIG. 7 schematically illustrates a structure of an example neural network operating in accordance with one or more aspects of the present disclosure.

FIG. 7 schematically illustrates a structure of a neural network operating in accordance with one or more aspects of the present disclosure. As shown in FIG. 7, the neural network 700 may be represented by a feed-forward, non-recurrent neural network including an input layer 710, an output layer 720 and one or more hidden layers 730 connecting the input layer 710 and the output layer 720. The output layer 720 may have the same number of nodes as the input layer 710, such that the network 700 may be trained, by an unsupervised learning process, to reconstruct its own inputs.

The neural network may include multiple neurons that are associated with learnable weights and biases. The neurons may be arranged in layers. The neural network may be trained on a training dataset of images. For example, the training data set may include examples of images containing multiple documents as training inputs and one or more identified and classified objects as training outputs.

The neural network may generate an observed output for each training input. During training of the neural network, the parameters of the neural network may be adjusted to optimize prediction accuracy. Training the neural network may involve processing, by the neural network, a set of input images, such that the network would generate the segmentation map (i.e., the observed output), and comparing the generated segmentation map with the known segmentation map (i.e., the training output corresponding to the target input as specified by the training data set). The observed output of the neural network may be compared with the training output, and the error may be propagated back to the previous layers of the neural network, whose parameters (e.g., the weights and biases of the neurons) may be adjusted accordingly in order to minimize the loss function (i.e., the difference between the observed output and the training output).

In particular, the neural network may be implemented as a set of expanded subsets of convolutional layers to be divided.

In some implementations of the present invention, these subsets may comprise a downscale block of layers. A downscale block of a convolutional neural network is a subset of convolutional layers that is configured to reduce spatial resolution of objects' features. Convolutions are performed separately, so that the starting convolutions are applied to larger feature maps. The separation of the convolutional layers in this subset of layers reduces processing time of this operation.

In some implementations of the present invention, these subsets may comprise at least one context block of layers. A context block is configured to improve features and exponentially increase receptor field at each convolutional layer. The last layer of the last context block produces a probabilistic segmentation map.

In some implementations of the present invention, these subsets may comprise a final classification block. The final classification block may be implemented by at least one convolutional layer of known dimensions and predetermined number of filters, where the number of filters corresponds to the number of types of objects to be recognized.

In some implementations of the present invention, these subsets may comprise an activation function applied after at least one convolution. In some implementations, the activation function is realized as a rectifier (ReLu) block.

The activation function may not be used after the last convolution. In some implementations of the present invention, a sigmoid function is applied to the first channel of the last convolution. In some implementations, a normalized exponential function (Softmax function) is applied to the other channels of the last convolution.

In some implementations of the present invention, each convolutional layer has the same number of channels (filters). This number of channels may be determined experimentally to maintain balance between productivity and compactness of the neural network. Compactness of the neural network allows its usage on devices with limited resources, such as mobile devices.

In some implementations of the present invention, resolution of input images for the network may be limited to match neural network parameters. For example, resolution 512×512 may be used as a resolution of the input image. Accordingly, the size of the receptive field of the convolutional neural network may be at least one half of the input image resolution. If the size of the receptive field is smaller, the context information in the receptive field may be insufficient for object detection.

In accordance with some implementations of the present invention, the segmentation map 110, produced by the neural network, has multiple channels, such that each channel corresponds to a particular object found in the input image. For example, a neural network with one channel may be used. The output of this channel may represent the probability of a particular superpixel being part of the object that is being detected. At block 120, the processing device performing method 100 may generate a superpixel binary mask for the input image based on the segmentation map 110. The superpixel binary mask may be generated by associating each superpixel of the superpixel segmentations map with a binary value that is derived from the probability characteristic reflecting the probability of the superpixel belonging to a certain object that is found in the input image. In some implementations of the present invention, the probability characteristic may be interpreted using a binarization threshold in order to identify binary label classes, such that the probability characteristic falling below the binarization threshold would yield "0" as the value of the corresponding superpixel binary mask element, while the probability characteristic exceeding or equal to the binarization threshold would yield "1" as the value of the corresponding superpixel binary mask element. In various implementations, the binarization threshold may be predetermined or variable.

At block 130, the processing device performing method 100 may identify connected components in the superpixel binary mask 120. A connected component is a group of pixels of the same value where each pixel in the group has at least one adjacent pixel of the same value.

At block 140, the processing device performing method 100 may identify a minimum bounding polygon for each connected component identified at step 130. In some implementations of the present invention, a minimum bounding polygon may be identified as a minimal area rectangle that contains a given connected component. In other implementations of the present invention, in order to identify the minimum bounding polygons for the connected components, the system first performs discretization of the superpixel binary mask, and then approximation by polygons.

Figure 6:
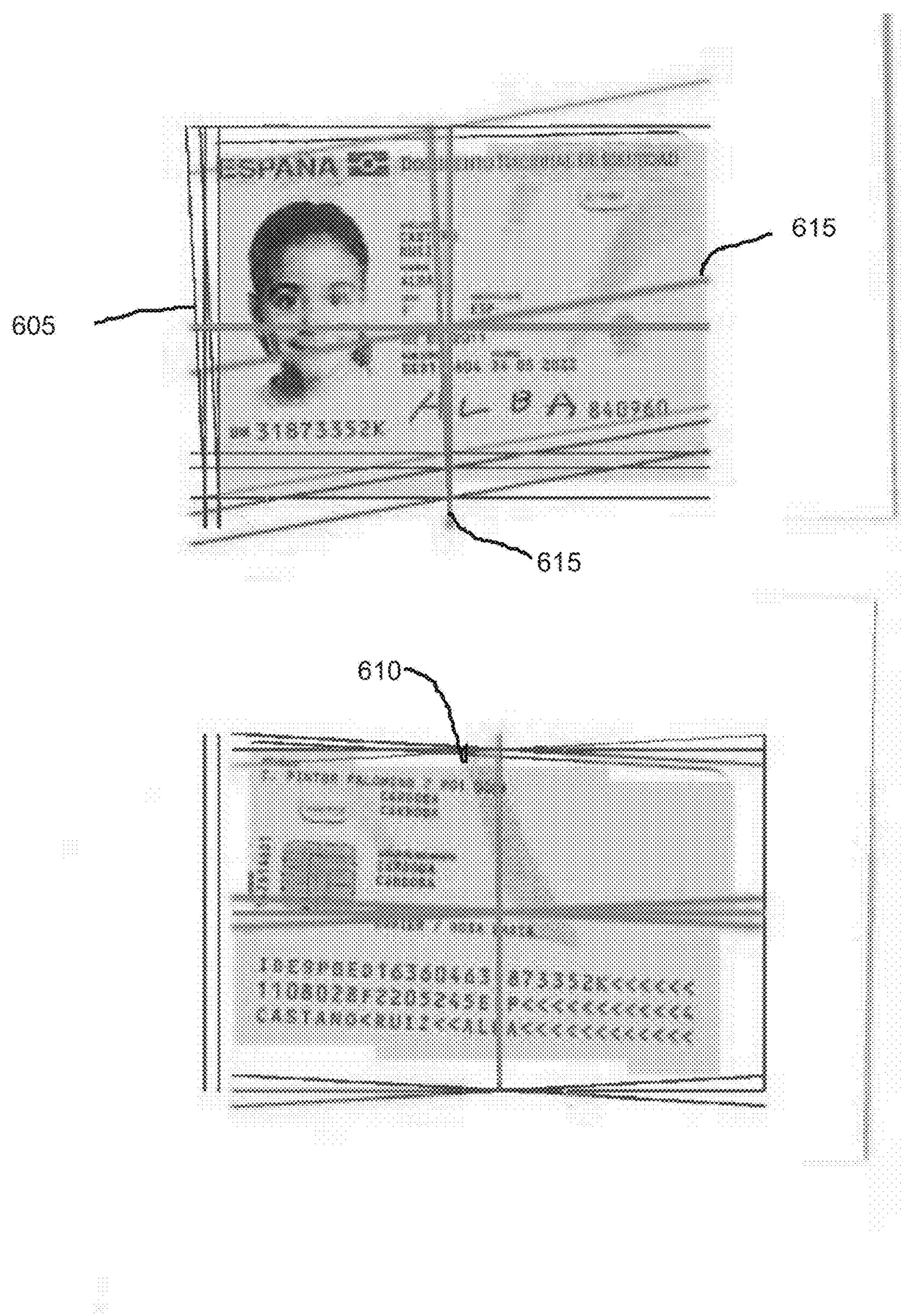
FIG. 6 illustrates exemplary image dividing lines created in accordance with some implementations of the present disclosure.

At block 150, the processing device performing method 100 may create image dividing lines based on the bounding polygons 140, as illustrated in FIG. 6. In some implementations of the present invention, the system first analyzes the superpixel binary mask 120 to generate the points defining the positions of tentative image dividing lines 605-6015. To that end, the system compares the number of pixels in the lines (rows or columns) of the superpixel binary mask 120 to the number of pixels in adjacent lines. If the number of non-zero pixels in a given line exceeds the number of non-zero pixels in the adjacent lines by at least a predetermined threshold, the coordinates of such a shift define a point that is potentially laying on an image dividing line. In some implementations of the present invention, the centers of connected components 615 are also added to the set of points defining the positions of tentative image dividing lines. In some implementations, one or more pixels that are adjacent to a center of a connected component are also added to the set of points defining the positions of tentative image dividing lines.

For each generated point, one or more tentative image dividing lines passing through the given point are generated, such that each generated tentative image diving line is parallel to a side of a minimum bounding box of a chosen connected component.

The tentative image dividing lines are then classified by their fitness, which can be computed based on a set of features including the gradient projection on the line, their standard deviations, the mean values of the probability map along the line, and/or the slope of the line. Values of the features are processed by a classifier (e.g., a trainable classifier, such as a neural network), which, in some implementations, may be a linear classifier.

For each tentative image dividing line, the classifier would generate its fitness value, which can be viewed as the probability of the image dividing line being determined correctly. In some implementations, all tentative image dividing lines having their fitness values exceeding a predetermined threshold are considered. Alternatively, a predetermined number of tentative image-dividing lines are considered.

At block 160, based on the classified hypotheses, the processing device performing method 100 may define the boundaries of regions of interest. A region of interest is a portion of the input image that closely approximates the position and shape of a document depicted by this image.

As a preliminary step, the system may discard empty connected components and/or connected components having their areas below a threshold value. Then, the system generates bounding polygons for the remaining connected components based on the tentative image dividing lines. The resulting bounding polygons define boundaries of detected regions of interest in the input image.

At block 170, the processing device performing method 100 may crop the identified regions of interest. In some implementations of the present invention, a cropped region may then be multiplied by the network scale to reverse image compression performed at step 110 when the image was converted to superpixels. Such multiplication may return the image to the original resolution.

In some implementations of the present invention, the tentative image dividing lines may be additionally classified based on the document type. Such classifiers may differ depending on the type of document to be identified using this classifier. In some implementations, such classifiers may distinguish between two specific document types. In some implementations, such classifier is implemented as a pretrained convolutional neural network. In other implementations, gradient boosting classifiers are used. In other implementations, gradient boosting is based on HOG (histograms of oriented gradients) features.

In some implementations, the classifiers are used to categorize dividing lines hypotheses. In other implementations, such classifiers are applied to classifying cropped regions of interest.

In some implementations of the present inventions, the system further analyses identified cropped regions of interest to determine whether these regions are parts of the same document (such as multiple pages of the same passport, two sides of the same identification card, etc.). Such analysis may comprise performing optical character recognition (OCR) in the regions of interest and comparing OCR results in different regions. Such analysis may be performed by heuristic methods or by pretrained classifiers, such as convolutional neural network.

Figure 2:
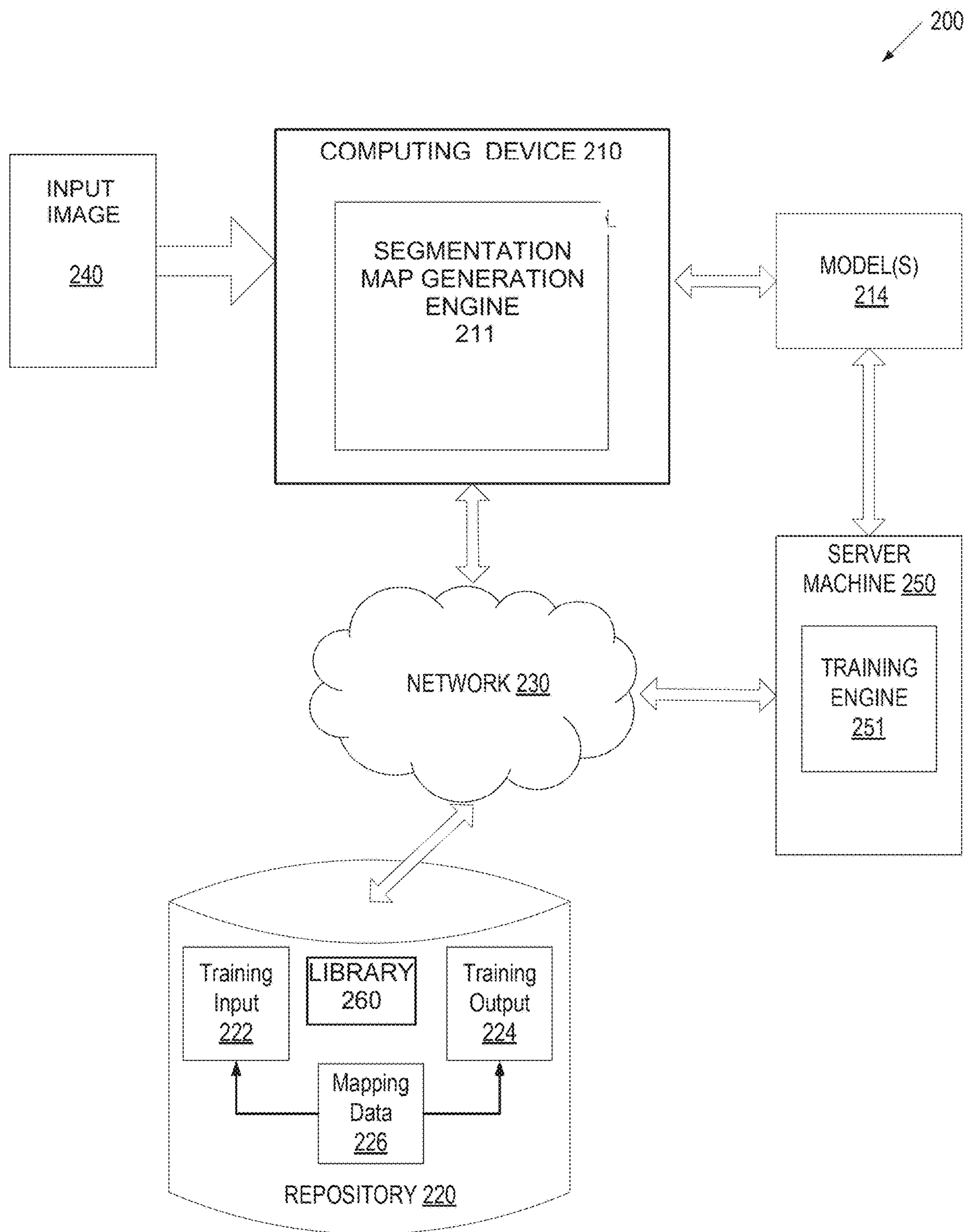
FIG. 2 illustrates a block diagram of an example computer system in accordance with some implementations of the present disclosure.

FIG. 2 is a block diagram of an example computer system 200 in which implementations of the disclosure may operate. As illustrated, system 200 can include a computing device 210, a repository 220, and a server machine 250 connected to a network 230. Network 230 may be a public network (e.g., the Internet), a private network (e.g., a local area network (LAN) or wide area network (WAN)), or a combination thereof.

The computing device 210 may be a desktop computer, a laptop computer, a smartphone, a tablet computer, a server, a scanner, or any suitable computing device capable of performing the techniques described herein. In some implementations, the computing device 210 can be (and/or include) one or more computing devices 300 of FIG. 3.

An input image 240 may be received by the computing device 210. The input image 240 may be received in any suitable manner. Additionally, in instances where the computing device 210 is a server, a client device connected to the server via the network 230 may upload an input image 240 to the server. In instances where the computing device 210 is a client device connected to a server via the network 230, the client device may download the input image 240 from the server or from the repository 220.

The input image 240 may be used to train a set of machine learning models or may be a new input image for which document detection is desired.

In one implementation, computing device 210 may include a segmentation map generation engine 211. The segmentation map generation engine 211 may include instructions stored on one or more tangible, machine-readable storage media of the computing device 210 and executable by one or more processing devices of the computing device 210.

In one implementation, the segmentation map generation engine 211 may use a set of trained machine learning models 214 to generate one or more segmentation maps in a library of marked-up images containing multiple documents 260. The library of marked-up images containing multiple documents may be stored in a repository 220. The machine learning models 214 are trained and used to generate segmentation maps on images.

The segmentation map generation engine 211 may be a client-based application or may be a combination of a client component and a server component. In some implementations, the segmentation map generation engine 211 may execute entirely on the client computing device such as a server computer, a desktop computer, a tablet computer, a smart phone, a notebook computer, a camera, a video camera, or the like. Alternatively, a client component of segmentation map generation engine 211 executing on a client computing device may receive an input image and transmit it to a server component of the segmentation map generation engine 211 executing on a server device that performs the segmentation map generation. The server component of the segmentation map generation engine 211 may then return a generated segmentation map to the client component of the segmentation map generation engine 211 executing on the client computing device for storage. Alternatively, the server component of the segmentation map generation engine 211 may provide a generation result to another application. In other implementations, segmentation map generation engine 211 may execute on a server device as an Internet-enabled application accessible via a browser interface. The server device may be represented by one or more computer systems such as one or more server machines, workstations, mainframe machines, personal computers (PCs), etc.

Server machine 250 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 250 may include a training engine 251. The training engine 251 can construct the machine learning model(s) 214 for segmentation map generation. The machine learning model(s) 214, as illustrated in FIG. 2, may be trained by the training engine 251 using training data that includes training inputs and corresponding training outputs (correct answers for respective training inputs). The training engine 251 may find patterns in the training data that map the training input to the training output (the answer to be predicted) and provide the machine learning models 214 that capture these patterns. The set of machine learning models 214 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning models 214 may include one or more neural networks as described in connection with FIG. 1.

The machine learning models 214 may be trained to generate one or more segmentation maps from the input image 240. The training data may be stored in the repository 220 and may include one or more training inputs 222 and one or more training outputs 224. The training data may also include mapping data 226 that maps the training inputs 222 to the training outputs 224. During the training, the training engine 251 can find patterns in the training data 226 that can be used to map the training inputs to the training outputs. The patterns can be subsequently used by the machine learning model(s) 214 for future predictions. For example, upon receiving an input of an input image, the trained machine learning model(s) 214 may generate segmentation map for this input image and may provide such segmentation map as an output.

The repository 220 may be a persistent storage capable of storing structures to perform segmentation map generation in accordance with implementations of the present disclosure. The repository 220 may be hosted by one or more storage devices, such as main memory, magnetic or optical storage-based disks, tapes or hard drives, NAS, SAN, and so forth. Although depicted as separate from the computing device 210, in an implementation, the repository 220 may be part of the computing device 210. In some implementations, repository 220 may be a network-attached file server, while in other implementations content repository 220 may be some other type of persistent storage such as an object-oriented database, a relational database, and so forth, that may be hosted by a server machine or one or more different machines coupled to the via the network 230.

Figure 3:
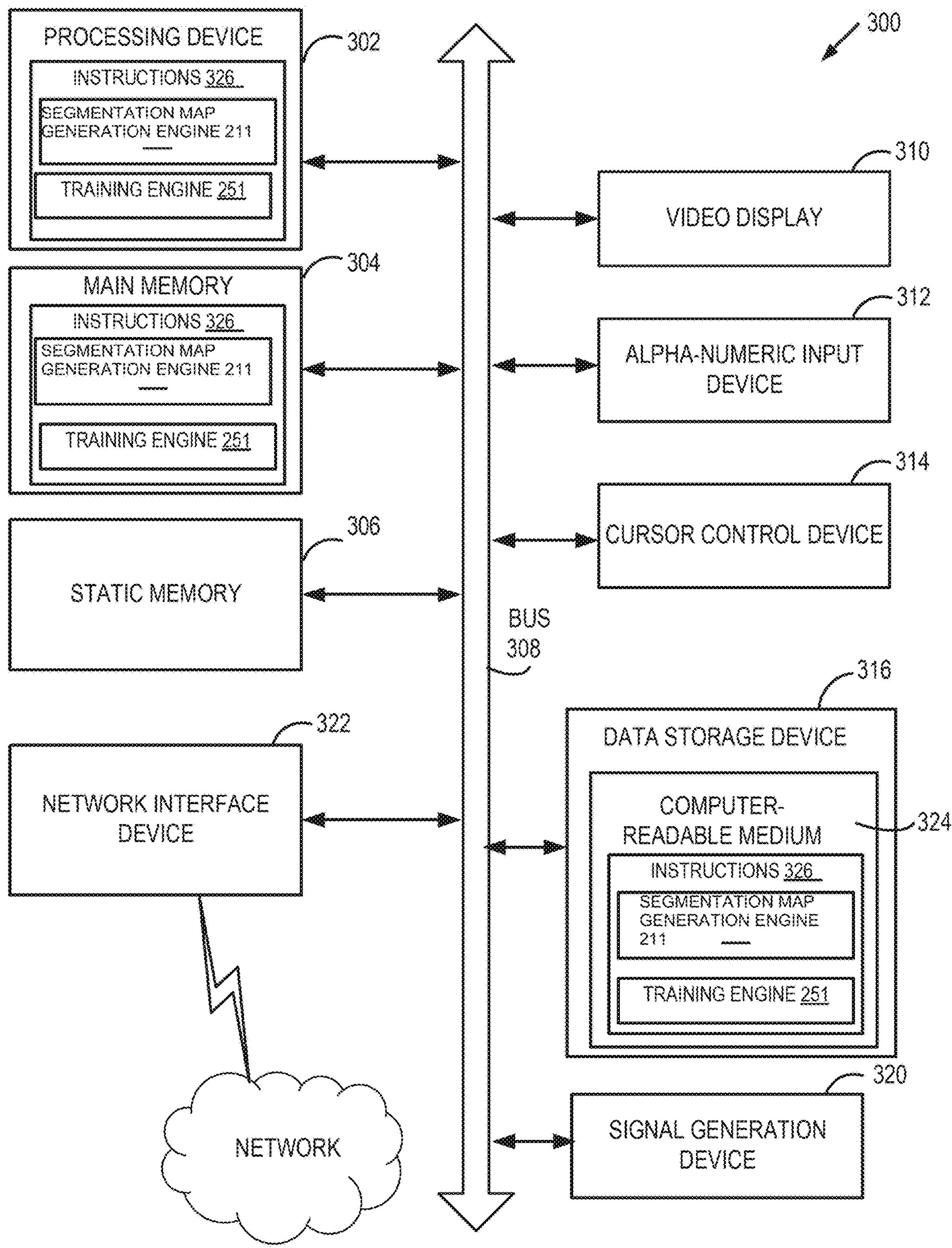
FIG. 3 illustrates a block diagram of an example computer system in accordance with some implementations of the present disclosure.

FIG. 3 depicts an example computer system 300 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 300 includes a processing device 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 326 for implementing the segmentation map generation engine 211 and/or the training engine 251 of FIG. 2 and to perform the operations and steps discussed herein (e.g., method 100 of FIG. 1).

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker). In one illustrative example, the video display unit 310, the alphanumeric input device 312, and the cursor control device 314 may be combined into a single component or device (e.g., an LCD touch screen).

The data storage device 316 may include a computer-readable storage medium 324 on which is stored the instructions 326 embodying any one or more of the methodologies or functions described herein. The instructions 326 may also reside, completely or at least partially, within the main memory 304 and/or within the processing device 302 during execution thereof by the computer system 300, the main memory 304 and the processing device 302 also constituting computer-readable media. In some implementations, the instructions 326 may further be transmitted or received over a network via the network interface device 322.

While the computer-readable storage medium 324 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "of". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A computer-implemented method for document image detection, comprising:

generating a superpixel binary mask associated with an input image, wherein each superpixel of the superpixel binary mask is derived from a probability characteristic reflecting a probability of the superpixel belonging to a certain object found in an input image;

identifying a connected component in the superpixel binary mask;

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a candidate boundary of a minimum bounding polygon associated with the connected component;

creating one or more image dividing lines based on the minimum bounding polygon; and defining boundaries of one or more regions of interest based on at least a subset of the image dividing lines.

2. The method of claim 1, wherein the superpixel binary mask is generated based on a chosen binarization threshold.

3. The method of claim 1, wherein the first line is provided by one of: a row of the superpixel binary mask or a column of the superpixel binary mask.

4. The method of claim 1, wherein identifying the minimum bounding polygon further comprises:

generating a plurality of candidate lines for the minimum bounding polygon;

computing a value of a quality metric for the one or more regions of interest.

5. The method of claim 4, wherein generating the plurality of candidate lines for the minimum bounding polygon further comprises:

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a second candidate boundary of the bounding polygon, wherein the first line is provided by one of: a row of the superpixel binary mask or a column of the superpixel binary mask.

6. The method of claim 4, wherein generating the plurality of candidate lines for the minimum bounding polygon further comprises:

utilizing, as a second candidate boundary of the bounding polygon, a line traversing a center of the superpixel binary mask.

7. The method of claim 4, wherein computing a value of a quality metric for one or more regions of interest further comprises:

applying, to the one or more regions of interest, a trainable classifier.

8. A system, comprising:

a memory;

a processor, coupled to the memory, the processor configured to:

generate a superpixel binary mask associated with an input image, wherein each superpixel of the superpixel binary mask is derived from a probability characteristic reflecting a probability of the superpixel belonging to a certain object found in an input image;

identify a connected component in the superpixel binary mask;

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilize the second line as a candidate boundary of a minimum bounding polygon associated with the connected component;

create one or more image dividing lines based on the minimum bounding polygon; and define boundaries of one or more regions of interest based on at least a subset of the image dividing lines.

9. The system of claim 8, wherein the superpixel binary mask is generated based on a chosen binarization threshold.

10. The system of claim 8, wherein the first line is provided by one of: a row of the superpixel binary mask or a column of the superpixel binary mask.

11. The system of claim 8, wherein identifying the minimum bounding polygon further comprises:

generating a plurality of candidate lines for the minimum bounding polygon;

computing a value of a quality metric for the one or more regions of interest.

12. The system of claim 11, wherein generating the plurality of candidate lines for the minimum bounding polygon further comprises:

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a second candidate boundary of the bounding polygon, wherein the first line is provided by one of: a row of the superpixel binary mask or a column of the superpixel binary mask.

13. The system of claim 11, wherein generating the plurality of candidate lines for the minimum bounding polygon further comprises:

utilizing, as a second candidate boundary of the bounding polygon, a line traversing a center of the superpixel binary mask.

14. The system of claim 11, wherein computing a value of a quality metric for one or more regions of interest further comprises:

applying, to the one or more regions of interest, a trainable classifier.

15. A non-transitory computer-readable storage medium comprising executable instructions that, when executed by a computer system, cause the computer system to:

generate a superpixel binary mask associated with an input image, wherein each superpixel of the superpixel binary mask is derived from a probability characteristic reflecting a probability of the superpixel belonging to a certain object found in an input image;

identify a connected component in the superpixel binary mask;

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilize the second line as a candidate boundary of a minimum bounding polygon associated with the connected component;

create one or more image dividing lines based on the minimum bounding polygon; and define boundaries of one or more regions of interest based on at least a subset of the image dividing lines.

16. The non-transitory computer-readable storage medium of claim 15, wherein the superpixel binary mask is generated based on a chosen binarization threshold.

17. The non-transitory computer-readable storage medium of claim 15, wherein the first line is provided by one of: a row of the superpixel binary mask or a column of the superpixel binary mask.

18. The non-transitory computer-readable storage medium of claim 15, wherein identifying the minimum bounding polygon further comprises:

generating a plurality of candidate lines for the minimum bounding polygon;

computing a value of a quality metric for the one or more regions of interest.

19. The non-transitory computer-readable storage medium of claim 18, wherein generating the plurality of candidate lines for the minimum bounding polygon further comprises:

responsive to determining that a first number of pixels in a first line of the superpixel binary mask exceeds, by at least a predetermined threshold, a second number of pixels in a second line of the superpixel binary mask which is adjacent to the first line of the superpixel binary mask, utilizing the second line as a second candidate boundary of the bounding polygon, wherein the first line is provided by one of: a row of the superpixel binary mask or a column of the superpixel binary mask.

20. The non-transitory computer-readable storage medium of claim 18, wherein generating the plurality of candidate lines for the minimum bounding polygon further comprises:

utilizing, as a second candidate boundary of the bounding polygon, a line traversing a center of the superpixel binary mask.

* * * * *